2,007,133

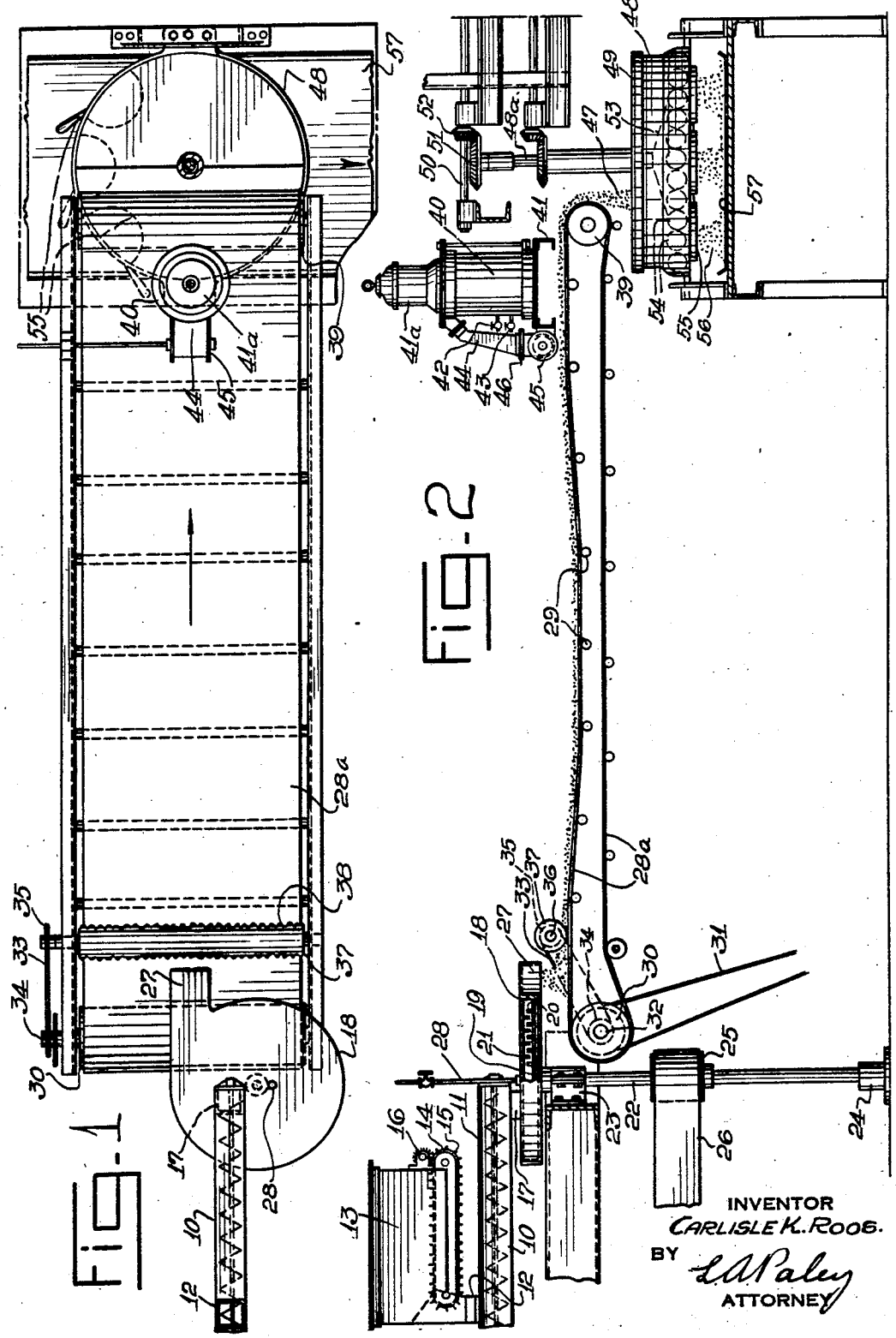
July 2, 1935.  C. K. ROOS  2,007,133
GYPSUM SLAB AND METHOD OF MANUFACTURING SAME
Filed Jan. 29, 1932
INVENTOR
CARLISLE K. ROOS.
BY
ATTORNEY Patented July 2, 1935

UNITED STATES PATENT OFFICE 2,007,133

GYPSUM SLAB AND METHOD OF MANUFACTURING SAME

Carlisle K. Roos, Wheaton, Ill., assignor to United States Gypsum Company, Chicago, Ill., a corporation of Illinois Application January 29, 1932, Serial No. 589,591

11 Claims. (Cl. 154—88)

This invention relates to gypsum slabs, and to a method of preparing gypsum mixes for molding and casting purposes, such as for the manufacture of gypsum plaster boards and blocks.

Heretofore it has been customary to pass a layer of dry calcined gypsum, one or more inches in height, through a water bath in a continuous manner for the purpose of wetting the mass. Another system of soaking the calcined gypsum in a continuous manner on an endless rubber belt, consists in applying a water spray to the top surface of the dry calcined gypsum either with or without subsequently passing it through a water bath.

Any of these methods of continuous wetting and soaking produce variable results. For example, in the preparation of a calcined gypsum slurry for the formation of gypsum plaster-board, the usual system of soaking which comprises spraying the surface and passing the mass through a water bath, requires about two to three minutes for completion after which it passes through the slow speed mechanical, finger-mixing operation which requires about one more minute. The calcined gypsum slurry is then continuously discharged in front of the forming roll.

The resultant slurry mix is at times lumpy and usually non-uniform in consistency. This condition is usually due to the fact that the calcined gypsum is never wetted uniformly. It either floats in clumps which are dry inside and wet on the outside, or it stays on the belt conveyor at the bottom of the water bath, in which event it is partially wet through with a more or less dry layer left at the bottom. Under these conditions the slurry is composed of particles which have been subjected to varying soaking periods. Consequently, the degree of hydration and character of gel, and the start of crystallization in various parts of the slurry mass is irregular. It has been found that under these conditions the full strength capacity of the gypsum is not completely developed for reasons which will be shown.

The use of foam in gypsum mixes has produced set slabs having a higher heat insulating value and lower density, but the slabs possess a somewhat lower strength.

An object of the invention, therefore, is to provide gypsum slabs and a method of preparing gypsum mixes, consisting of a combination of steps which will produce a molding slurry which is smooth and free from lumps and is also of uniform consistency.

Another object of the invention is to provide a method of mixing gypsum plastic material, which will produce casts having uniform density, high strength and uniform hydration and crystallization.

Another object of the invention is to produce a gypsum slab of superior strength in which both foam and vegetable fibers are used in their production.

A further object of the invention is to provide an apparatus for carrying out the method, which is practical for the high speed production of gypsum casts; also to improve gypsum slabs, mixing methods and apparatus in other respects hereinafter specified and claimed.

Reference is to be had to the accompanying drawing forming a part of this specification, in which Fig. 1 is a plan view of the mixing apparatus, and Fig. 2 is an elevation of the mixing apparatus with parts broken away to disclose the construction.

I have found that by thoroughly and uniformly wetting calcined gypsum almost instantaneously and then allowing it to remain quiescent for two to five minutes during the hydration and gel stage, several advantages are obtained, particularly if the slurry is then treated with a high speed mixing operation for a period of fifteen to forty seconds. There are no nonbalanced stresses set up in the cast due to delayed or nonuniform crystallization, or uneven density to cause warping of the finished cast which occurs in operations where un-uniform hydration and crystallization are present. Furthermore, the fluidity of the slurry stream is uniform and free from lumps. As a result higher tensile and compressional values are obtained consistently.

I have also found that relatively high speed agitation of the mass after soaking increases the strength of the gypsum cast as compared to the strength obtained from gypsum slurries prepared by the "finger mixer" and other types of slow agitation means. The following table shows the effect of speed of agitation on the strength of ordinary calcined gypsum prepared in each case with the same amount of water and soaking time, but agitated at various speeds:

| Method of mixing | Compressive strength lbs. per inch | Tensile strength lbs. per inch |
|---|---|---|
| | Pounds | Pounds |
| No mixing | 464 | 187 |
| Hand mixing | 842 | 197 |
| Agitation at 164 R. P. M. | 1056 | 229 |
| Agitation at 1,000 R. P. M. | 1150 | 228 |

The effect of high speed agitation is apparently one of producing a more homogeneous mix and intimate contact of crystal edges in the hardened cast.

In carrying out the method, the gypsum stucco or plaster of Paris is continuously conveyed from a storage bin, not shown, by a screw conveyor 10 which is preferably of the ribbon type so that a combined mixing and conveying action is obtained. At one position, the cover 11 of the screw conveyor housing is provided with an inlet duct 12, which is connected with a wood fiber hopper 13, the latter being used to contain wood fiber, hair or other types of animal, vegetable or mineral fibers desired to introduce into the plastic mixture. An endless conveyor 14, having rakes 15, passes through the fiber hopper 13 and delivers a continuous stream of fiber through the chute 12 into the screw conveyor housing. A rotary brush 16 operates upon the rakes 15 adjacent the rear wall of the hopper 13 so as to prevent fiber from packing into the spaces between the rakes 15. The ribbon conveyor 10 intimately mixes the dry plaster of Paris with the fiber and delivers same through a duct 17 into a mixer housing 18.

Various types of mixing devices may be used for intimately mixing this fiber-stucco mixture with water, but I prefer the type of mixer disclosed in the patent to Pfeffer and Trotter No. 1,758,200. This mixer consists of a circular plate 19 extending in a horizontal plane and having teeth 20 formed on its upper surface in annular rows which operate between annular rows of teeth 21 rigidly formed to the bottom face of the housing cover 18. A shaft 22 supporting the plate 19 extends downwardly through the mixer housing and is rotatably received in bearings 23 and 24. The shaft 22 is rotated at a high speed by means of a pulley 25 connected by a belt 26 to a source of power not shown, such as an electric motor. The housing 18 has a tangential discharge spout 27 and a water inlet pipe 28 connected near the center of rotation of the disc 19. The duct 17 is also located near the center of rotation so that the water and stucco-fiber mixture is thrown outwardly at a high speed between the mixing fingers 20 and 21, being discharged as a thin slurry from the spout 27 onto a soaking belt 28a, which is preferably constructed of rubber composition or other suitable material. The upper reach of the belt 28a is preferably carried on rollers 29 which form said belt into a trough shape to retain the slurry for a soaking period during the hydration and gel stage where the water completely hydrates the stucco. A driving pulley 30 supports the belt 28a adjacent the mixer housing 18, said pulley being driven by a belt 31 leading from a source of power, such as an electric motor. The pulley 30 is carried on a shaft 32 and a chain 33 connects a sprocket wheel 34 on shaft 32, to a sprocket wheel 35 on a shaft 36. A roll 37 having annular flutes or corrugations 38, is carried on the shaft 36 and rotates above the upper reach of the belt 28a so as to spread the slurry out over the belt.

In order to lower the density of the resulting cast, I preferably introduce a light weight foam into the slurry at a point near an idler delivery roller 39 which supports the soaking belt 28a. This foam is produced by a foam cell 40 which is mounted above the belt 28a on a frame work 41. This foam cell consists of a cylindrical casing upon which is mounted a motor 41a which serves to rapidly rotate beaters inside of the housing 40. A foam solution, which may consist of a solution of soapbark and water, is introduced into the housing 40 though an inlet pipe 42, and compressed air may also be introduced into the housing through an inlet pipe 43. The foam produced is delivered from the foam cell 40 through a duct 44 which is provided with a rotary feeder 45 and control slides 46. The foam is deposited in a uniform manner by the feeder 45 onto the top of the slurry carried by the belt 28a.

The plastic mixture 47 above described, is delivered from the belt 28a into a mixer 48, which may be of any desired type. However, I prefer to use the type of mixer disclosed in the patent to Gough, McNeil and Pfeffer No. 1,767,791. This mixer consists of a housing in cylindrical form arranged with its axis vertical. A shaft 48a extends upwardly through the cover 49 of the mixer and is operated by a suitable driving shaft 50 through a bevel gear 51 and bevel pinion 52, so as to operate mixing elements 53 contained within the housing of the mixer. An opening is provided in the cover 49 to permit the slurry from belt 28a to flow into the mixer. One or more balls 54 are also preferably contained in the housing to aid in the mixing operation. Outlet spouts 55 formed in the mixer housing discharge the thoroughly mixed plastic material 56 to any desired discharge point, such as on top of a moving sheet of paper 57 which forms one of the paper cover sheets of a plasterboard in a manner well known to the art. The spout 55 may also discharge the plastic mixture into the molds of a block forming machine if desired.

In the operation of the apparatus, wood fiber from hopper 13 is delivered to duct 12 into conveyor housing 10 and thoroughly mixed with dry gypsum stucco by the ribbon conveyor. The mixture is delivered by duct 17 into the mixer housing 18 near the center of rotation of disc 19, and water is also introduced into said housing through pipe 28a. The materials are thrown outwardly at a high speed between teeth 20 and 21 to accomplish a preliminary mixing, and the resulting slurry is delivered by spout 27 onto the soaking belt 28a, being spread evenly over the belt by the corrugated roll 37. The thin slurry is carried forwardly on soaking belt 28a where the water thoroughly hydrates the plaster of Paris in the mixture. Foam is delivered from foam cell 40 through duct 44 and feeder 45 onto the top of the slurry on the belt 28a, and the mixture 47 is then delivered into a mixer 48 which completes the mixing operation and delivers the plastic mixture 56 onto a moving sheet of paper 57, the molds of a block molding machine, or other desired discharge point.

The use of vegetable fibers in conjunction with the foam and my improved mixing process is especially advantageous in producing gypsum boards having high flexibility, toughness, strength and ability to withstand cracking when nailed near the edges to a supporting stud. In practice, I prefer to use about 25 lbs. of fibers per 1000 sq. ft. of ⅜" board but this proportion can be varied between 10 and 75 lbs. with good results. Wood fibers are preferred, but other vegetable fibers such as oat hulls, or animal fibers such as hair, may be used with fair results. Fine wood fibers are preferred having a maximum length of ½". The use of these fibers in conjunction with the foam in the gypsum mix, increases the strength across the grain of the resulting board by about 22% and lengthwise of the grain, the strength is increased about 32%. At the same time, the weight of the board is decreased by about 10% over that obtained through the use of foam alone.

Instead of adding foam to the gypsum-water mixture, a foaming agent may be added to the dry stucco, either as a solution or in powder form to the first mixer, or in a dry or solution form to the slurry on the soak belt. As dry foaming agents, or gas entrainers, soap bark, saponin or blood albumen are suitable. Foaming agents which may be introduced as solutions are glue, saponin, resin soap, or a flotation oil, such as pine oil.

I would state in conclusion that while the illustrated examples constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:—

1. The method of preparing gypsum mixes, which comprises mechanically mixing calcined gypsum with water, permitting said gypsum-water mix to soak for a predetermined period, mechanically mixing the soaked mixture, and delivering said mixture into a form to set into a cast.

2. The method of preparing gypsum mixes, which comprises mechanically mixing calcined gypsum with water, conveying the gypsum-water mix without agitation for a predetermined soaking period, mechanically mixing the soaked mixture, and delivering said mixture into a form to set into a cast.

3. The method of preparing gypsum mixes, which comprises mechanically mixing calcined gypsum, fiber and water, permitting said mixture to soak for a predetermined period, mechanically mixing the soaked mixture, and delivering said mixture into a form.

4. The method of preparing gypsum mixes, which comprises mechanically mixing calcined gypsum with water to form a slurry permitting said slurry to soak for a predetermined period, adding foam to said mixture, mechanically mixing the soaked slurry and foam, and delivering said mixture into a form to set into a cast.

5. The steps in the method of preparing gypsum mixes, which comprise mechanically mixing a mixture of calcined gypsum and water at two predetermined periods of time, and allowing said mixture to hydrate in a quiescent state between said mixing operations.

6. The method of preparing gypsum mixes, which comprises mechanically mixing powdered calcined gypsum, fiber and water to form a slurry, permitting said slurry to soak for a predetermined period in a substantially quiescent state, mechanically mixing foam with said slurry, forming the slurry-foam mixture between cover sheets to set and form a plaster board, and drying said plaster board.

7. The steps in the method of preparing gypsum mixes, which comprise mechanically mixing powdered, calcined gypsum, fiber, foam and water to form a slurry, said mechanical mixing being divided into two periods with an intervening quiescent period of predetermined length, and forming said slurry into a cast.

8. The steps in the method of preparing gypsum mixes, which comprise mechanically mixing powdered, calcined gypsum, fiber and water to form a slurry, said mechanical mixing being divided into two periods with an intervening, substantially quiescent period of predetermined length, and forming said slurry into a cast.

9. The steps in the method of preparing gypsum casts, which comprise agitating powdered, calcined gypsum, water and foam to form a slurry, said agitation extending during a plurality of time intervals with an intervening, substantially quiescent period of predetermined length, and forming said slurry into a cast.

10. An article of manufacture comprising a slab of set gypsum containing minute cells connected by vegetable fibers, said slab having high tensile and compressive strengths obtained by mechanically mixing, soaking, and mechanically mixing the plastic mixture producing said slab.

11. An article of manufacture comprising a slab of set gypsum containing minute cells, said slab having high tensile and compressive strengths obtained by mechanically mixing, soaking, and mechanically mixing the plastic mixture producing said slab.

CARLISLE K. ROOS.